Figure 1:
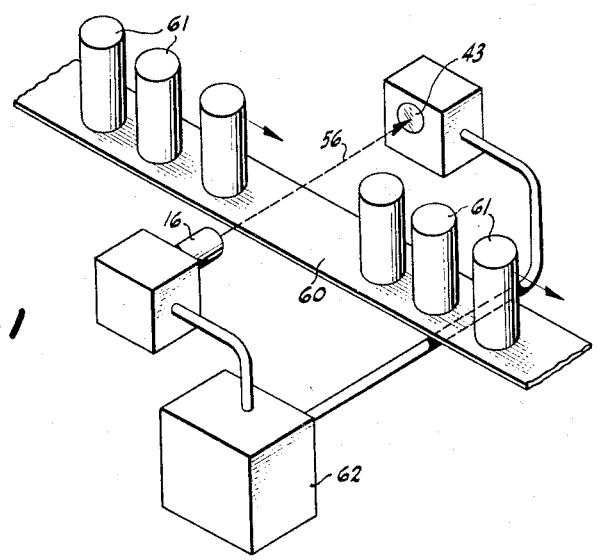

Nov. 28, 1961     FRANCIS MERRITT BOYCE     3,011,101
ALSO KNOWN AS FRANCIS MERRITT BOYCE, SR.,
FRANK BOYCE, F. M. BOYCE AND FRANK MERRITT
PHOTOTUBE CONTROL CIRCUIT
Filed Nov. 4, 1957

INVENTOR.
FRANCIS M. BOYCE, DECEASED.
BY MARGUERITE BOYCE, ADMINISTRATRIX.

BY *Mellin and Hanscom*
ATTORNEYS

United States Patent Office 3,011,101
Patented Nov. 28, 1961

3,011,101
PHOTOTUBE CONTROL CIRCUIT
Francis Merritt Boyce, also known as Francis Merritt Boyce, Sr., Frank Boyce, F. M. Boyce, and Frank Merritt, deceased, late of San Francisco, Calif., by Marguerite Boyce, administratrix, 735½ Minna St., San Francisco, Calif.
Filed Nov. 4, 1957, Ser. No. 694,172
1 Claim. (Cl. 317—130)

This invention rleates to and has for its principal object a phototube operated control circuit, and more particularly to a phototube operated relay circuit in which a control relay is operated in response, and after a predetermined time delay, to the sensing of a condition by a phototube.

In many industrial applications it is convenient to use light sensitive devices, or phototubes, to control machinery in response to a change in the light falling on the phototube. An example of such an application is the use of a phototube device to control an article handling conveyor, such that if the articles flow freely past the phototube station, the phototube device will be inoperative, but if the articles pile up in the path of light to which the phototube is responsive, appropriate machinery will be turned on or off as desired. In such an application, the passing articles will intermittently break the light beam for the length of time it takes to pass the phototube station, and it is desirable to have the phototube control device non-responsive to such intermittent interruption, while yet responding to a prolonged interruption of the light beam as would occur when the conveyor is jammed, in order that appropriate mechanism may be operated. Accordingly, it is desirable to have a photosensitive control device with a built-in time delay so that normal intermittent interruption of the light beam will have no effect on the relay controlled by the phototube, whereas a prolonged interruption will cause the relay to be energized.

Applicant has devised such a time delayed photo-sensitive control device, in which a single thermionic tube is controlled by a phototube, and the plate circuit of the thermionic tube includes a control relay. By such an arrangement, the number of components in the circuit is held to a minimum, and the control relay is energized only when the phototube is blocked from its actuating light beam for longer than the time delay for which the device is set.

It is an object of this invention to provide a time delayed phototube circuit comprising a vacuum tube having a grid connected through a high resistance to a source of voltage, and a cathode connected to a less positive source of voltage, a phototube having a plate connected to the vacuum tube control grid and a cathode connected to a source of voltage less positive than either of the two other voltage sources, and a capacitor connected between the cathode and control grid of the vacuum tube.

A further object of the invention is to provide a time delayed phototube circuit as set forth in the preceding object, and having a plurality of capacitors adapted to be connected between the cathode and control grid of the vacuum tube, and a switch to connect one of the capacitors so as to give a desired range of time delay, or to connect none of the capacitors so that no time delay will be introduced into the circuit.

A further object of the invention is to provide a phototube circuit in which the phototube leads may be made much longer than normally possible while yet retaining successful operation of the device.

A further object is to provide a time delayed phototube circuit in which a single vacuum tube amplifier stage controls a control relay in response to the sensing of a condition by a phototube, and in which the control relay is only energized after a predetermined time has elapsed following the sensing of the condition.

Other objects and advantages will be apparent in the course of the following detailed description.

In the accompanying drawings, forming a part of this application, and in which like numerals are used to indicate like parts throughout the same, FIG. 1 is a generally schematic view illustrating one use of the invention.

Figure 2:
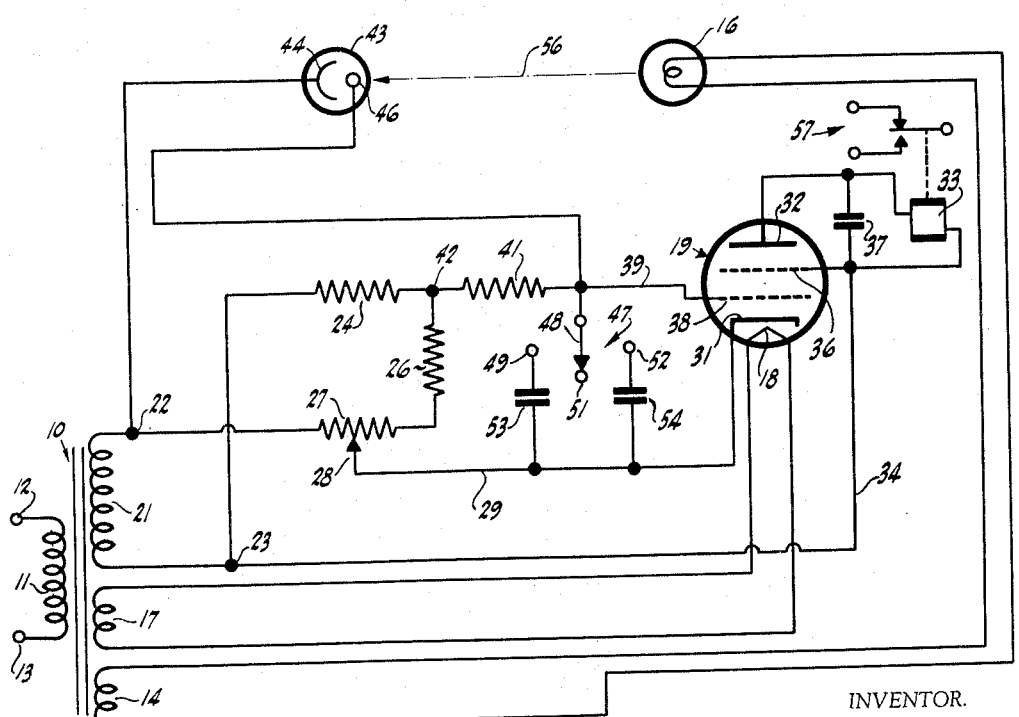

FIG. 2 is a circuit diagram of the phototube device embodying the principles of the invention.

Referring in particular to FIG. 2, the reference numeral 10 indicates a transformer provided with a primary winding 11 having terminals 12 and 13 adapted to be connected to a conventional alternating current power source.

The transformer 10 is provided with a first secondary winding 14 having its terminals connected to a lamp, or other electrically energizable light source, 16. A second secondary winding 17 is connected to the heater filament 18 of tube 19.

A third secondary winding 21 is provided having terminals 22 and 23 across which is connected a voltage dividing network comprising resistors 24, 26 and potentiometer 27, the movable arm 28 of potentiometer 27 being connected by wire 29 to cathode 31 of vacuum tube 19. The plate 32 of tube 19 is connected to one side of control relay 33, the other side of which is connected by wire 34 to terminal 23 of secondary winding 21. As is conventional, the screen grid 36 of tube 19 is connected to wire 34.

Since the circuit is designed for alternating current operation, the tube 19 will conduct only on the half cycle when its plate 32 is positive with respect to its cathode 31, and accordingly a capacitor 37 is connected across the plate relay 33 to prevent tis opening during the half cycles of non-conduction of tube 19.

The control grid 38 of tube 19 is connected by wire 39 through a high resistance resistor 41 to the junction 42 of resistors 24 and 26.

A phototube 43 is provided, with its cathode 44 connected to terminal 22 of secondary winding 21, and with its plate 46 connected to control grid wire 39.

A time delay switch 47 is provided, having a movable switch arm 48 connected to control grid wire 39 and adapted to engage one of the switch terminals 49, 51 or 52. A first capacitor 53 is connected between switch terminal 49 and wire 29, and a second capacitor 54 is connected between switch terminal 52 and wire 29. The third switch terminal, 51, is unconnected to provide an off position for switch 47.

For purposes of illustration, one set of components that has been used in the above described circuit is as follows: The tube 19 is a 6AQ5, resistors 24, 26, 27 and 41 have respective values of 56,000, 2,200, 2,000 and 15 megohms, while capacitors 53 and 54 have respective values of .5 and .25 micro-farad. With these components it is desirable to use a transformer 10 providing approximately 130 volts across secondary winding 21. It is to be understood that these particular values are illustrative only, and are not set forth as limiting the invention, as other sets of components having different values may be used to perform the same result.

The circuit above described operates in the following manner. Assuming that the transformer 10 is energized such that the instantaneous voltage on terminal 23 is positive with respect to terminal 22, that the phototube 43 is energized by a light beam 56, and that the switch 47 is in a position as shown in FIG. 2; an electron flow will occur from transformer terminal 22 through phototube 43, resistors 41 and 24 to transformer terminal 23. The phototube current through resistor 41 will bias the control grid 38 negatively with respect to cathode 31 so that tube 19 will not conduct a sufficient plate current to energize the plate relay 33. If the light beam 56 is interrupted, the effective resistance of the phototube 43 will increase, and electron flow through the resistor 41 will decrease, causing the grid 38 to become positive with respect to cathode 31, and tube 19 will permit a sufficient plate current therethrough to energize relay 33, causing it to operate the relay switch 57. When the phototube 43 is again energized by light beam 56, the phototube electron flow through resistor 41 will immediately bias the grid negatively with respect to the cathode so that the tube 19 will cease to pass sufficient plate current to energize the plate relay 33, causing the relay switch 57 to drop out and return to its normal position.

In the above operation, the relay 33 will be operated substantially instantaneously each time the light beam 56 is interrupted. If it is desired to obtain a time delay between the interruption of the light beam and the operation of the relay, the switch 47 is moved so as to connect the switch arm 48 to either switch terminal 49 or 52, so as to connect either condenser 53 or 54 across the control grid and cathode of tube 19, depending upon the length of time delay desired.

Assuming the same initial conditions as above, but with condenser 53 connected into the circuit, the electron flow resulting from the energization of phototube 43 will again flow through the grid biasing resistor 41 causing the grid 38 to be biased sufficiently negatively with respect to cathode 31 so that the plate current through tube 19 is insufficient to energize the relay 33. At the same time, the capacitor 53 will be charged to the same voltage between the grid and cathode of tube 19. If the light beam to the phototube is interrupted, the phototube current will decrease, but the capacitor 53 will discharge through resistor 41 to prevent the grid 38 from immediately becoming positive with respect to cathode 31 as before. The time lag before the grid voltage rises sufficiently to allow the plate current of tube 19 to energize the relay 33 will be a function of the RC time constant primarily of resistor 41 and capacitor 53, as well as the grid-cathode bias setting of the potentiometer 27. With the values of the components as given, the time delay between the interruption of light beam 56 and the energization of relay 33 will be in the order of from 2 to 3.5 seconds, depending upon the grid bias setting of the potentiometer 27.

If the phototube is again energized by light beam 56 the capacitor 53 will very rapidly assume its original charge, as the charge path does not include the high resistance resistor 41, and the phototube current again passes through resistor 41 biasing the grid 38 sufficiently negative that the plate current is insufficient to actuate the relay 33. If the interrupted light beam is restored before the relay has been actuated then the tube 19 never passes sufficient plate current to energize relay 33.

A shorter time delay range may be obtained in the device by operating switch 47 so as to place capacitor 54 across the cathode and grid of tube 19. The capacitor 54 has a smaller capacity value than capacitor 53 and thus the RC time constant of resistor 41 and capacitor 54 is shorter, and the grid voltage will rise more rapidly if the light beam 56 is cut off. Again, the time delay may be varied within the time delay range by adjusting the potentiometer 27 to give a desired grid bias.

It is to be noted that the only time that the relay 33 actuates the switch 57 is when the light beam 56 is cut off, and the desired time delay has elapsed. If the light beam is cut off for periods less than the desired time delay, then the relay 33 and switch 57 are not actuated.

FIG. 1 illustrates a use of the phototube device, in controlling a can conveying operation. Reference numeral 60 indicates a conveyor belt carrying spaced cans 61 past a phototube station, such that the light source 16 directs a light beam 56 across the belt to the phototube 43. The remainder of the circuitry of FIG. 2 is housed with a suitable cabinet 62.

As the cans 61 are moved by the conveyor belt 60, they interrupt the light beam 56. If it were desired to use the phototube circuit of FIG. 2 as a counting device, switch 57 could be connected to a conventional pulse counter to accumulate the number of times that switch 57 was operated. In this case, the time delay switch 47 would be turned to its "off" position, or as shown in FIG. 2, so that each interruption of the light beam 56 would cause the relay switch 57 to be actuated.

If it is desired to use the phototube device so as to be responsive to a jam-up of cans on the conveyor belt, in order that appropriate machinery be turned off, the relay switch 57 is connected to the machine to be controlled. The time delay switch 47 is operated to select one of the capacitors 53 or 54 to obtain the desired time delay range. In this case, each can 61 will again break the light beam 56 as it passes therethrough, the length of time that the beam is broken being dependent upon the speed of the conveyor belt and the size of the cans 61. If the operative time delay setting of the phototube circuit is greater than the length of time in which the beam is broken, then the tube 19 will not pass sufficient plate current to energize relay 33 and relay switch 57 remains in its normal position. If, however, the cans 61 jam up in the path of the light beam, the beam will be broken and after the time delay has elapsed without the beam being reinstated, the grid voltage will rise, the tube 19 will conduct, the relay 33 will be energized, and the switch 57 will be actuated to shut off the desired machinery. The time delay setting of the phototube circuit is varied by selecting the proper range by switch 47, with the desired setting within the selected range being obtained by adjusting the grid bias by the potentiometer 27.

For reasons which are not entirely apparent it has been found that the use of the capacitors 53 or 54 across the cathode and grid of tube 19 has enabled the phototube leads from transformer terminal 22 and grid wire 39 to be made much longer than is usually possible. Ordinarily, such phototube leads must be no longer than about three feet or so, unless special shielding precautions or wiring is used, whereas in the present device, the phototube has successfully operated at distances up to 30 or 40 feet from the rest of the circuit. Generally, the capacity between the phototube leads is sufficient in even relatively short leads to allow enough current flow therebetween to render the phototube inoperative. However, in the present device, the capacitors 53 and 54 in some manner overcome, or balance, the effect of the phototube lead capacity such that the phototube leads can be much longer than is ordinarily possible and still obtain successful operation of the circuit.

It is to be understood that the form of the invention herewith shown and described is to be taken as a preferred embodiment of the same, and that various changes in the values of the components and arrangements of parts may be resorted to without departing from the spirit of the invention or the scope of the attached claim.

What is claimed is:

A phototube circuit comprising: a potentiometer having a movable contact arm, a series resistance network connected at one end thereof to one end of said potentiometer, a fixed tap on said network between the one end of said potentiometer and the other end of said network, energizing means connected to the other ends of said potentiometer and said network for impressing a voltage on the other end of said network which is more positive than the voltage on the other end of said potentiometer, an electron discharge tube having a cathode, control grid and plate, an electrical connection between the movable contact arm of said potentiometer and said cathode, plate circuit means electrically connecting said plate and the other end of said network, a resistor electrically connected between said fixed tap and said control grid, a phototube adapted to be exposed to a light beam and having a plate electrically connected to said control grid and a cathode electrically connected to said other side of said potentiometer, a plurality of capacitors, and means including a multiple position switch for electrically connecting desired of said capacitors between the cathode and control grid of said electron discharge tube in accordance with the position of said switch, said switch having a position wherein none of said capacitors is so connected.

References Cited in the file of this patent

UNITED STATES PATENTS

| | | |
|---|---|---|
| 2,351,229 | Potts | June 13, 1944 |
| 2,385,725 | Pearson et al. | Sept. 25, 1945 |
| 2,416,595 | Reynolds | Feb. 25, 1947 |
| 2,466,634 | Breen | Apr. 5, 1949 |
| 2,466,751 | Thomson | Apr. 12, 1949 |
| 2,472,945 | Gingrich | June 14, 1949 |
| 2,507,001 | Ferte | May 9, 1950 |
| 2,715,720 | Jenkins | Aug. 16, 1955 |
| 2,821,670 | Bradley | Jan. 28, 1958 |